Nov. 17, 1931.  C. H. BRASELTON ET AL  1,831,995
VIBRATION OPERATED PUMPING MECHANISM
Original Filed Feb. 20, 1922
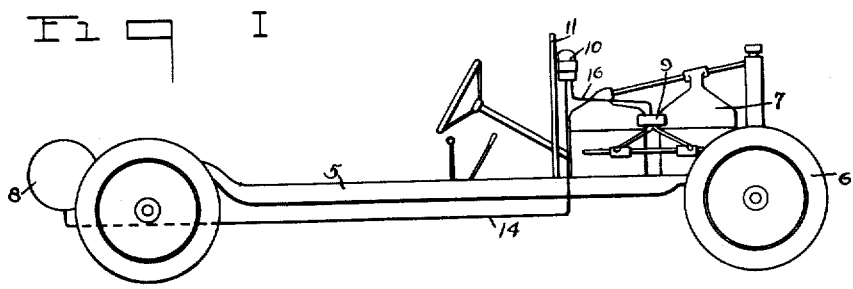
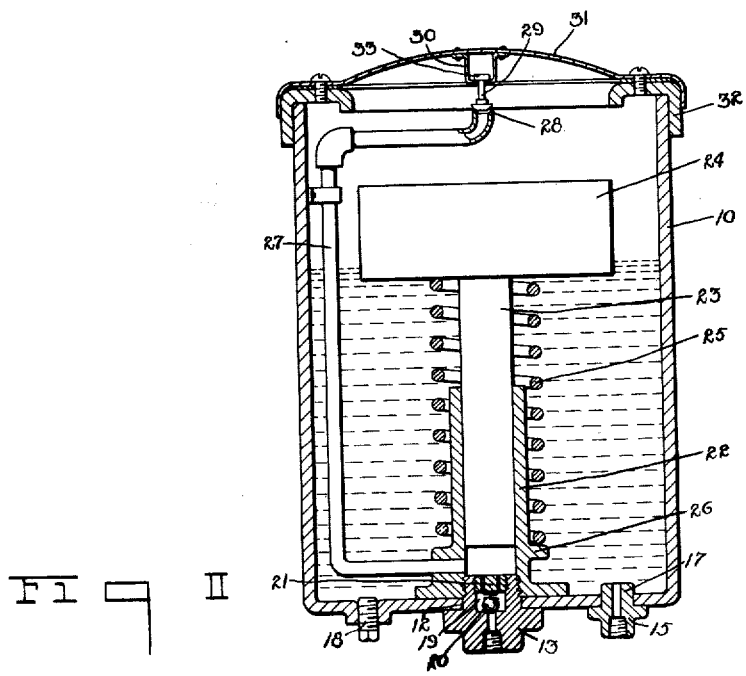

Patented Nov. 17, 1931

1,831,995

UNITED STATES PATENT OFFICE

CHESTER H. BRASELTON, OF NEW YORK, AND FRED B. MacLAREN, OF MALBA, LONG ISLAND, NEW YORK

VIBRATION OPERATED PUMPING MECHANISM

Application filed February 20, 1922, Serial No. 537,683. Renewed September 14, 1928.

This invention relates to improvements in liquid fuel feed apparatus of the type disclosed in our copending application filed February 1, 1922, Serial No. 533,493, in which the feed is operated by external vibrations imparted to the device.

The principal object of the invention is the provision of a vibration operated pumping means for supplying liquid fuel from a tank at a lower level than the engine carburetor to an auxiliary tank at a level above the carburetor in which the quantity of liquid fed to the auxiliary tank may be automatically controlled so that such quantity of liquid in the auxiliary tank will be maintained below a predetermined maximum.

Other objects and advantages will be apparent from the following description in which reference is had to the accompanying drawings forming a part of this specification, and in which similar reference numerals designate similar parts throughout out the several views.

In the drawings, Figure I is a diagrammatic side elevation of an automobile equipped with our improved apparatus, and Figure II is a central longitudinal section through the auxiliary tank and vibration operated pumping mechanism.

Referring now to the drawings, the numeral 5 designates the chassis of an automobile having the usual wheels 6, engine 7, rear fuel supply tank 8, carburetor 9, and our improved auxiliary tank 10 enclosing the pumping mechanism. The auxilary tank 10 is shown fastened to the front of the dashboard 11, although this may be connected in any convenient position upon the automobile at a sufficient height to enable liquid in the auxiliary tank to flow to the carburetor by gravity. The tank 10 is preferably cylindrical and is provided at its lower wall with an opening 12 in which is arranged a coupling 13 for connection with the forward end of the feed pipe 14 connecting the auxiliary tank 10 with the rear supply tank 8. A similar coupling 15 is threaded to receive the rear extremity of the feed pipe 16 connecting the tank 10 with the intake side of the carburetor. The coupling 15 is provided with an extension 17 projecting above the floor of the tank 10 to prevent the admission of water, sediment, and the like into the carburetor. A drainage plug 18 is provided for the release of such water, sediment or the like by permitting draining of the pump tank. The coupling 13 is provided with a valve of any desired construction, herein shown as having a chamber 19 containing a ball 20 normally arranged to seat over and close the aperture leading to the feed pipe 14. The upper wall of said chamber 19 is closed by a member 21 having a series of small apertures therein leading to the interior of the cylinder 22 which is centrally arranged within the tank 10, substantially as shown. A plunger 23 surmounted by a relatively heavy weight 24 forming an inertia member, is arranged to fit snugly within the cylinder 22, a spring 25 between the weight 24 and a shoulder 26 on the cylinder serving to maintain such plunger in unhindered, suspended position within the tank. A by-pass pipe 27 leads from the lower portion of the cylinder 22 around said inertia member to a point adjacent the top of the tank and is provided at its upper extremity with a seat 28 for the valve member 29 normally adapted to rest by its own weight in said seat. The valve member 29 is mounted within a guide bracket 30 secured centrally to a resilient diaphragm 31 secured upon a cap member 32 of the tank, the bracket 30 being arranged to permit free movement of the valve member until such time as the diaphragm 31 is distended upwardly by internal pressure so as to raise the valve member to a position preventing it from engaging the seat 28. A nut 33 is threaded upon the valve member 29 above the bracket 30 to maintain the same slidably within the guide bracket.

In operation, the vibrations of the automobile as it rolls along the road is sufficient to set in motion the tank 10, which it moves relatively to the inertia member formed of the plunger 23 and weight 24, which because of its relatively great mass is slow to vibrate and remains in a substantially stationary position. The downward movement of the tank 10 tends to lower the cylinder upon the plunger 23 creating a suction which lifts the ball 20 and draws in liquid from the supply tank 8 through the feed pipe 14. The upward movement of the tank 10 and cylinder 22 upon the plunger 23 tends to close the ball valve 20 and force the liquid then within the cylinder 22 into the interior of the tank 10 through the by-pass pipe 27. The next downward movement of the tank relatively to the inertia member will again draw liquid fuel into the cylinder 22, and this alternate admission and ejection of fuel from the cylinder 22 will be continued until the liquid within the tank 10 has reached a level whereby the air in the space above the level of the liquid in such tank has been compressed to an extent sufficient to distend the diaphragm 31, whereupon the valve member 29 will be held above the seat 28 so that the air under compression will enter the by-pass pipe 27. When this condition has been reached the relative movements of the tank and inertia member will not create a suction within the feed pipe 14 because the opening within the cylinder 22 will be filled more easily by air entering through the by-pass pipe 27, which air will merely be again ejected into the space within the tank on the alternate vibration. The flow of fuel from the tank 10 to the carburetor will continue without the admission of new fuel to the tank 10 until the lowering of the level of the liquid in the tank has permitted the air in the top of the tank to drop to a pressure low enough to permit the valve 29 to again seat in the by-pass pipe 27. The vibrations will thereupon again permit the pumping of liquid from the supply tank 8. The pressure of the air above the liquid in the tank 10 is useful in forcing the flow of fuel to the carburetor, as long as the pressure does not become too great. The flexibility of the diaphragm 31 is made so as to yield readily before the air is compressed to such undesirable degree.

The cap 32 is preferably soldered or otherwise firmly secured upon the wall of the tank 10, and is provided with a central aperture of sufficient diameter to permit the introduction of the inertia member and other internal mechanism. The horizontal flange between such central aperture and the outer wall of the cap 32 is employed to form a base to which the circular walls of the diaphragm 31 are attached, substantially as shown.

Having described our invention what we claim is:

1. In a fuel feeding mechanism a tank adapted to contain liquid fuel, an auxiliary tank arranged above the level of the supply tank and connected therewith by a feed pipe, an outlet pipe connected to the auxiliary tank, and means for pumping liquid from the supply tank to the auxiliary tank comprising a cylinder secured to the floor of said auxiliary tank, a weighted plunger fitting into said cylinder and forming an inertia member, a spring for normally maintaining the plunger in raised position, an inlet valve between the supply tank and the cylinder, an outlet pipe extending from the lower portion of the cylinder into proximity, with the top of the auxiliary tank, a valve arranged to normally seat upon the upper extremity of the outlet pipe, and means whereby said valve is maintained out of seating position when the pressure in said tank rises above a predetermined value.

2. In a fuel feeding mechanism, a supply tank, an auxiliary tank, a feed pipe between said tanks, an outlet pipe connected to the auxiliary tank, means for pumping liquid from the supply tank to the auxiliary tank including vibration operated mechanism, means for controlling the quantity of liquid in such auxiliary tank comprising a diaphragm arranged to be operated by the pressure of the air between the upper surface of the liquid and the top of the auxiliary tank, a pipe between the pump and diaphragm, and a valve in said pipe operated by the diaphragm.

3. In a fuel feeding mechanism, a supply tank, an auxiliary tank, a feed pipe between said tanks, an outlet pipe connected to the auxiliary tank, means for pumping liquid from the supply tank to the auxiliary tank including vibratory weight operated mechanism, and means for controlling the quantity of liquid in such auxiliary tank, comprising a valve cooperating with a portion of said pumping means and positioned by a diaphragm fixed upon the top of the auxiliary tank, said diaphragm being adapted to be distended by the air between the top of the liquid in said tank and the diaphragm.

4. In a fuel feeding mechanism, a supply tank, an auxiliary tank, a feed pipe between said tanks, an outlet pipe connected to the auxiliary tank, means for pumping liquid from the supply tank to the auxiliary tank including vibratory weight operated mechanism, and means for controlling the quantity of liquid in such auxiliary tank comprising a diaphragm forming a portion of the wall of said auxiliary tank and arranged to be operated by the pressure of the air within the tank, a valve mounted on said diaphragm and adapted to be opened thereby for disabling said pump, and a pipe between the valve and pump.

5. In a fuel feed mechanism the combination of a supply tank; an auxiliary tank; an outlet pipe connected to the auxiliary tank; means susceptible to external vibrations of the auxiliary tank for pumping liquid from the supply tank to the auxiliary tank and including an outlet valve above the liquid level in the auxiliary tank; and pressure operated mechanism for disabling the operation of the pumping means by maintaining open the outlet valve of said pumping means, said pressure operated mechanism being dependent for its operation upon the variation of pressure within the auxiliary tank.

6. In fuel feed mechanism the combination of a supply tank; an auxiliary tank having an outlet; means susceptible to external vibrations of the auxiliary tank for pumping liquid from the supply tank to the auxiliary tank and including an outlet valve above the liquid level in the auxiliary tank; and means for disabling said pumping means by maintaining open the outlet valve of said pumping means, said pumping means and disabling means being wholly enclosed within said auxiliary tank, said disabling means including a diaphragm adapted to be flexed by pressure of gases within the auxiliary tank.

7. In a liquid feeding mechanism a supply tank; an auxiliary tank; a cylinder within said auxiliary tank; a conduit between said supply tank and said cylinder; a check valve in said conduit; an outlet pipe from said cylinder terminating near the top of said tank; a check valve in said outlet pipe; a diaphragm across the top of said tank and forming a gas tight closure for said tank; and means to maintain open said check valve in said outlet pipe when said diaphragm is flexed by the pressure in said auxiliary tank.

8. In a liquid feeding mechanism a supply tank; an auxiliary tank; means susceptible to external vibrations of the auxiliary tank for pumping liquid from said supply tank to said auxiliary tank and including an outlet value above the liquid level in the auxiliary tank, said means having an inlet valve and an outlet valve both adapted to operate by changes of pressure in said pumping means; and means to guide said outlet valve as it opens and closes to insure its proper seating, and to retain said outlet valve in open position when the pressure in said auxiliary tank exceeds a predetermined amount.

9. In a liquid feeding mechanism a supply tank; an auxiliary tank; an inertia operated pump in said auxiliary tank adapted to pump liquid from said supply tank to said auxiliary tank and an outlet valve for said pump both adapted to operate by changes of pressure in said pump; a diaphragm across the top of said auxiliary tank and forming a gas tight closure therefor; and means attached to said diaphragm to guide the movement of said outlet valve and to maintain said outlet valve in an open position when said diaphragm is flexed.

10. In a liquid feeding mechanism a supply tank; an auxiliary tank; an inertia operated pump in said auxiliary tank attached to the base thereof; a conduit connecting the inlet of said pump with said supply tank; an outlet pipe for said pump terminating near the top of said auxiliary tank; an inlet valve for said pump; an outlet valve at the end of said outlet pipe and adapted to seat by gravity; a diaphragm across the top of said tank and forming a gas tight closure for said tank; and means attached to said diaphragm adapted to guide the movement of said outlet valve and maintain said outlet valve in open position when said diaphragm is flexed.

11. In a liquid feed mechanism, the combination of a supply tank; an auxiliary tank; a conduit between said tanks; pumping means having an inlet valve and an outlet valve for pumping liquid from the supply tank to the auxiliary tank; and means sensitive to variations in pressure within the auxiliary tank for maintaining the outlet valve of said pumping means open to render the pumping means inoperative to act upon the inlet valve to admit liquid to said auxiliary tank.

12. In a liquid feed mechanism, the combination of a supply tank; an auxiliary tank; a conduit between said tanks; pumping means having an inlet valve and an outlet valve for pumping liquid from the supply tank to the auxiliary tank; and means sensitive to variations of pressure within the auxiliary tank for maintaining open the outlet valve of said pumping means to render the same inoperative to act upon the inlet valve to admit liquid to said auxiliary tank, said last mentioned means including a diaphragm connected to the outlet valve and adapted to be flexed by pressure of gases within the auxiliary tank.

13. In a liquid feed mechanism, the combination of a supply tank; an auxiliary tank; a conduit between said tanks; pumping means operable by vibrations externally applied to the auxiliary tank and having an inlet valve and an outlet valve for pumping liquid from the supply tank to the auxiliary tank, said auxiliary tank having an end thereof closed by a diaphragm connected to the outlet valve and adapted to be flexed by variations of pressure within the auxiliary tank, said diaphragm upon being flexed outwardly of the auxiliary tank being adapted to open said outlet valve to disable the pumping means and render the same inoperative to act upon the inlet valve to admit liquid to said auxiliary tank.

14. In a liquid feed mechanism, the combination of a supply tank; an auxiliary tank; means for pumping fuel from the supply tank to the auxiliary tank; and means, including a diaphragm above the liquid level in said auxiliary tank, sensitive to variations in pressure of the gases above the liquid in said tank for rendering the pump ineffective to supply liquid to said auxiliary tank without hindering the movement of the pumping means.

In testimony whereof, we affix our signatures.

CHESTER H. BRASELTON.
FRED B. MacLAREN.

14. In a liquid feed mechanism, the combination of a supply tank; an auxiliary tank; means for pumping fuel from the supply tank to the auxiliary tank; and means, including a diaphragm above the liquid level in said auxiliary tank, sensitive to variations in pressure of the gases above the liquid in said tank for rendering the pump ineffective to supply liquid to said auxiliary tank without hindering the movement of the pumping means.

In testimony whereof, we affix our signatures.

CHESTER H. BRASELTON.
FRED B. MacLAREN.

CERTIFICATE OF CORRECTION.

Patent No. 1,831,995.   Granted November 17, 1931, to

CHESTER H. BRASELTON and FRED B. MacLAREN.

It is hereby certified that the above numbered patent was erroneously issued to the inventors said "Braselton and MacLaren", whereas said patent should have been issued to Chester H. Braselton, as assignee of the entire interest in said invention, as shown by the records of assignments in this office; and that the said Letters Patent should be read with this correction therein that the same may conform to the record of the case in the Patent Office.

Signed and sealed this 9th day of February, A. D. 1932.

M. J. Moore,
Acting Commissioner of Patents.

(Seal)

CERTIFICATE OF CORRECTION.

Patent No. 1,831,995. Granted November 17, 1931, to

CHESTER H. BRASELTON and FRED B. MacLAREN.

It is hereby certified that the above numbered patent was erroneously issued to the inventors said "Braselton and MacLaren", whereas said patent should have been issued to Chester H. Braselton, as assignee of the entire interest in said invention, as shown by the records of assignments in this office; and that the said Letters Patent should be read with this correction therein that the same may conform to the record of the case in the Patent Office.

Signed and sealed this 9th day of February, A. D. 1932.

(Seal)

M. J. Moore,
Acting Commissioner of Patents.